April 4, 1944.  G. W. MORK  2,345,620
TRACTOR PROPELLED IMPLEMENT
Filed May 1, 1942  2 Sheets-Sheet 2
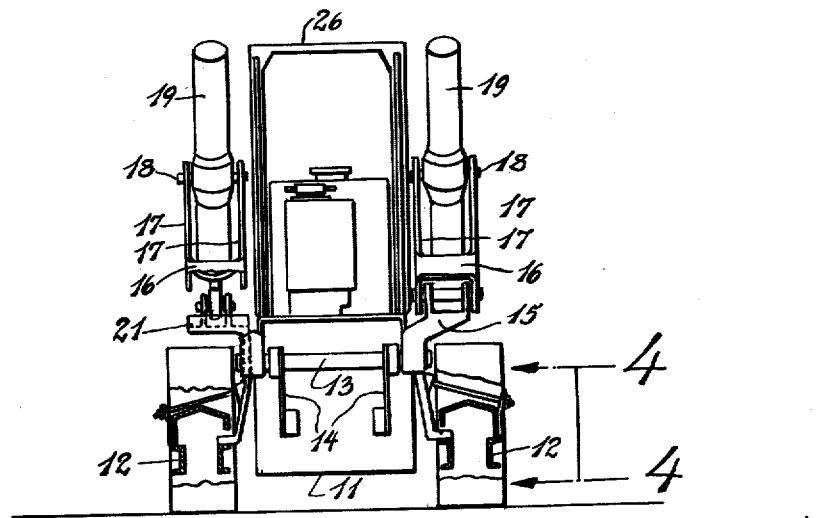
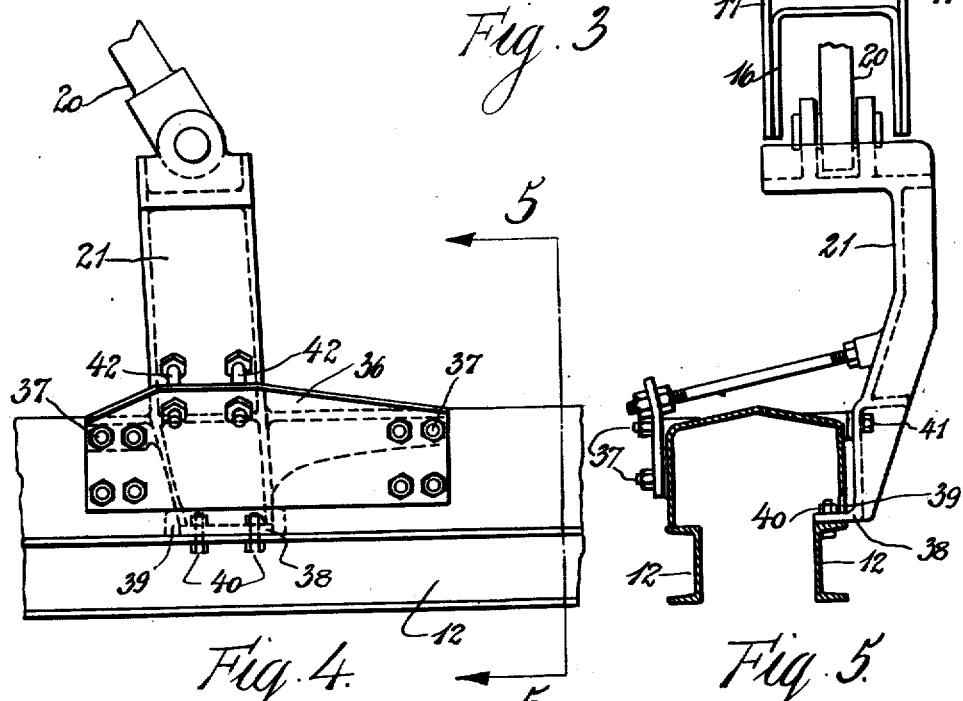
George W. Mork.
INVENTOR.
BY Hoar + Ruhloff
ATTORNEYS Patented Apr. 4, 1944

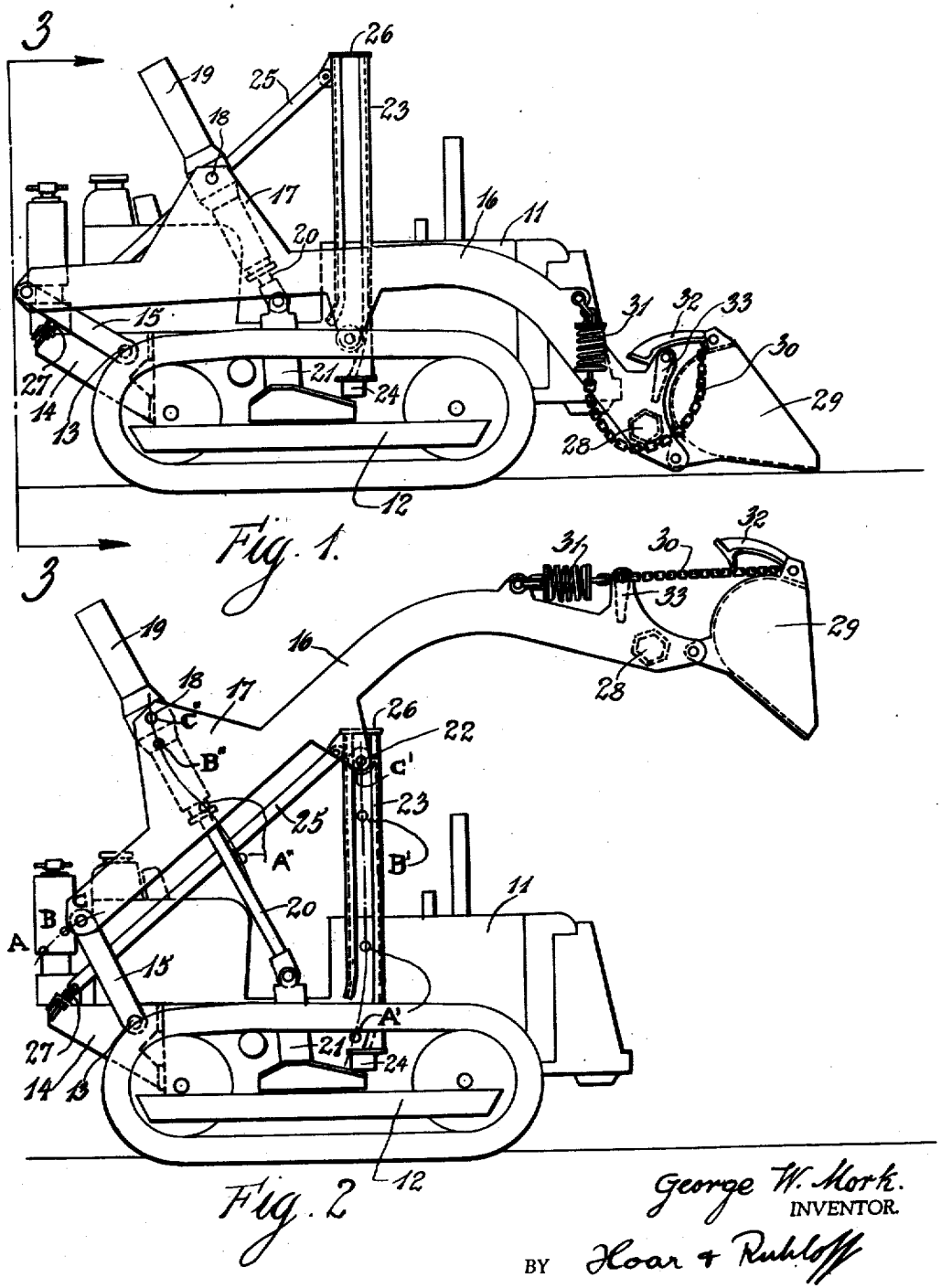

2,345,620

UNITED STATES PATENT OFFICE 2,345,620

TRACTOR PROPELLED IMPLEMENT

George W. Mork, South Milwaukee, Wis., assignor to Bucyrus Erie Company, South Milwaukee, Wis., a corporation of Delaware Application May 1, 1942, Serial No. 441,306

12 Claims. (Cl. 214—139)

My invention relates to new and useful improvements in tractor propelled and operated implements, and more particularly push-scoops for tractors.

Implements of that type are adapted to be attached to conventional tractors, either wheeled or creeping-traction, preferably the latter. The implement proper is usually mounted on the ends of two arms, which straddle the tractor laterally, are supported by the main tractor frame and/or the traction frames, and extend in front of or behind the tractor. Power means are provided for raising and lowering the implement proper, it being forced into the bank, for digging, by the forward motion of the tractor. As more specifically shown and described herein, the implement and tractor constitute together a tractor-shovel.

The problem of designing such a tractor-shovel is complicated by the following considerations. If the push-arms are pivoted at their rear ends, then the dipper will either have to project too far in front of the tractor, when digging, or will not be far enough in front when raised to dump. But if the rear ends of the push-arms run in slides, or are telescoping, instead of being pivoted, such construction is expensive and ill-adapted to take the heavy thrust reactions of digging, and is likely to become clogged with dirt.

Accordingly the principal object of my invention is to devise a push scoop for tractors which will have all of the advantages and none of the disadvantages of each of these methods of mounting.

In addition to this object, I have worked out a number of novel and useful details, which will be readily evident as the description progresses.

My invention consists in the novel parts and in the combination and arrangement thereof, which are defined in the appended claims, and of which one embodiment is exemplified in the accompanying drawings, which are hereinafter particularly described and explained.

Throughout the description, the same reference number is applied to the same member or to similar members.

Figure 1 is the side elevation of my scoop in digging position.

Figure 2 is the same in dumping position.

Figure 3 is the rear-elevation of my scoop in digging position, taken along the line 3—3 of Figure 1 and cut partly away on the left side.

Figure 4 is an enlarged side elevation of the bracket which supports one of my pistons on the traction frame, and of the mounting of said bracket, all along the lines 4—4 of Figure 3.

Figure 5 is the front elevation of this bracket and its mounting, taken along the lines 5—5 of Figure 4.

Referring now to Figures 1, 2 and 3, we see that 11 is a conventional tractor, mounted on creeping traction frames 12. The details of the tractor form no part of my invention, and are immaterial except so far as hereinafter discussed.

A cross-shaft 13 is journaled in brackets 14, which in turn are rigidly secured to the main tractor frame 11.

Keyed to shaft 13 are two upwardly projecting links 15, each of which supports pivotally at its upper rear end the rear end of one of push-arms 16; but this is merely the preferable means of mounting these links. Intermediate the ends of each push-arm 16 are two upstanding brackets 17, in which are journaled the trunnions 18 of a fluid pressure cylinder 19. These cylinders are preferably double-acting.

The piston rod 20 of each cylinder 19 is pivoted to a bracket 21, which is secured to one of the traction frames in a manner which will be later described herein.

Carried by each push-arm 16 is a roller 22, or other convenient guide, which slides in a vertical guideway 23 supported by the main tractor frame in any convenient manner. As shown, the guideway 23 is secured to a bracket 24 on the main frame, and braced by a back brace 25. The two guide-ways 23 are tied together at their tops by a cross-brace 26.

An adjustable stop 27 is carried by each bracket 14, to limit the downward motion of the rear end of the corresponding push-arm 16. Preferably, but not necessarily, this stop is so carried, and bears against link 15.

It is to be noted that, at the bottom of each guideway 23, the front thereof is curved at practically the same curve as, and the back thereof is curved a little more sharply than, a circular arc about the lowest position of the rear pivot of the corresponding push-arm 16; and, in fact, the back portion is terminated considerably short of the front portion. Accordingly, when the rear ends of the push-arms are in their lowest position, the front ends of the push-arms can swing in an arc, without any of the digging thrust being taken by the guideways, and hence all the digging thrust is taken by the stops 27 and links 15. If one is willing to subject the guideways 23 to some of this thrust, these stops 27 may be omitted.

In place of the guideways 23 and rollers 22, substantially the same vertical movement of that part of arms 16 where rollers 22 are located could be attained by substituting, for the guideways and rollers, two long links pivoted to the arms at 22, and to the main tractor frame at a remote point located substantially in the perpendicular bisector of guideways 23. Accordingly when, in the claims, I specify "means to constrain a point on the arm to move substantially vertically," I do not intend to be limited to the guideway-roller combination.

The front end of the push-arms are tied together by a cross torque-box 28. The digging dipper 29 is pivoted to the push arms. Chains 30, with shock-absorbing springs 31, constrain the degree of dumping tilt of the dipper.

The dipper is held in digging position, as shown in Figure 1, by a dipper-latch 32, the details of which form no part of my present invention. The latch can be tripped by lever 33, controllable, in conventional manner, by an appropriate cord (not shown).

In place of dipper 29, I could substitute any alternative material-handling instrumentality (such, for example, as the dumping bulldozer blade of my copending application, Serial No. 406,091, filed August 9, 1941, now Patent No. 2,303,379, granted December 1, 1942) without thereby departing from the spirit of my present invention.

Figures 4 and 5 show the method whereby I attach my bracket 21 to the traction frames of the particular form of tractor employed by me, although these details form no part of the present invention.

Supported on the inner and outer channels 12 of the traction frames, there is a housing 33, which exists for the dual purpose of covering the spring-take-up (not shown) and providing outer bosses 34 and inner bosses 35 for the attachment of auxiliary equipment. To the outer bosses 34 I secure bent plate 36 by bolts 37. A foot 38 of my bracket 21 projects through a gap 39 in the housing 33, and rest on channel 12, to which it is secured by bolts 40.

It will be noted that foot 38 is directly under the thrust of piston-rod 20, and hence transmits that thrust to the inner channel 12 without side thrust. But bracket 21 is further secured, for mere steadying purposes, to bosses 35 by bolts 41, and to bent plate 36 by bolts 42.

Reverting now to the cylinder-piston assembly, it should be noted that, although highly preferable, it is not essential that the cylinder be pivoted on the push-arm, and the piston on the track frame, rather than vice-versa, nor that either be pivoted on the track frame, rather than on some other portion of the tractor.

The location and direction of thrust of the piston is important, although not essential. If located too far to the rear, too much force is required; whereas, if located too far to the front, too much travel is required.

If link 15 be too long, the dipper will not rise sufficiently, unless we provide unduly high guideways and cylinders, which would interfere with clearance. But, on the other hand, if link 15 be too short, the dipper will be too inclined and too far to the rear in its dumping position. And, if link 15 be much too short, guide 22 will be constrained against travelling all the way up guideway 23.

As for direction of thrust of the piston, it is highly advisable that this be such that the reaction of the links 15 will as closely as possible balance the reaction of the guideways 23.

The interrelation between these two reactions will now be discussed. Referring to Figure 2, let us consider three positions of the upper end pivot of link 15. A is the position of Figure 1. C is the position of Figure 2. And B is an intermediate position, such that the upward pull of link 15 will be directed exactly at the rear axle (i. e., the axle about which the main tractor frame 11 pivots on the track frames 12).

Between A and B, link 15 tends to lift the front of the tractor frame. Between B and C, link 15 tends to depress the front of the tractor frame.

Corresponding positions of guide-roller 22 are correspondingly marked A', B' and C'. Note that here A' is a line rather than a point. It can be demonstrated mathematically that here again B' is almost exactly the point at which the direction of push against the guideways reverses.

Above B', the roller bears against the rear guide, thus tending to lift the front of the tractor frame. Below B' the roller bears against the front guide, thus tending to depress the front of the tractor frame. In the field, it is interesting to observe the direction of rotation of the guide-roller reverse as it passes through this point.

Thus the reactions of links 15 on the tractor frame and of guideways 23 on the tractor frame tend to offset each other throughout the entire cycle, thus reducing the strain on the springs which support the front of the tractor frame on the track frames.

Still referring to Figure 2, the corresponding successive positions of the trunnion 18 have been marked A", B" and C", and a line has been drawn through these points to indicate the path of travel of the trunnion. Note that here again A" is a succession of positions rather than a single position.

It will be seen that I have so adjusted the location, dimensions and proportions of the push-arms 16, links 15, piston assemblies 18, 20, and guides 23, that the path of travel of each trunnion 18 is practically a straight line, and that the corresponding piston acts substantially along this line during the entire travel.

Having now described and illustrated one form of my invention, I wish it to be understood that my invention is not to be limited to the specific form or arrangement of parts herein described and shown, except as specifically covered by my claims.

In the claims, when I mention the "tractor," I intend indiscriminately any part of the tractor as a whole. When I intend either the main tractor frame or the traction frames, I shall so specify.

I claim:

1. In a material-handling implement for attachment to a tractor which has a main frame and two creeping traction frames pivotally attached thereto, the combination of: two arms; and the implement proper, attached to the arms; each arm being supported and manipulated by the following described mechanism: a link, pivotally attached to the main tractor frame near the rear thereof and projecting upwardly therefrom, and pivotally attached to the rear end of the arm, and so disposed that at some intermediate position of this link its line of action will intersect the line of pivotal attachment of the creeping traction frames to the main tractor frame; a stop, carried by the main tractor frame, and adapted to limit the downward motion of the rear end of the arm; a substantially vertical guideway, carried by the main tractor frame near the front thereof; guide means, carried by the arm, to engage the guideway during the upper portion of its travel, and to be free of the guideway during the lower portion of its travel; a cylinder, pivotally attached to the arm, intermediate its rear end and the guide means; and a piston, in the cylinder, pivotally supported by the traction frame; the cylinder-piston assembly being so disposed that the path of the pivotal attachment to the arm is approximately a straight line, substantially coincident with the line of action of the piston in all positions thereof.

2. In a material-handling implement for attachment to a tractor which has a main frame and two creeping traction frames pivotally attached thereto, the combination of: two arms; and the implement proper, attached to the arms; each arm being supported and manipulated by the following described mechanism: a link, pivotally attached to the main tractor frame near the rear thereof and projecting upwardly therefrom, and pivotally attached to the arm, and so disposed that at some intermediate position of this link its line of action will intersect the line of pivotal attachment of the creeping traction frames to the main tractor frame; a substantially vertical guideway, carried by the main tractor frame near the front thereof; guide means, carried by the arm, to engage the guideway; and a cylinder-piston assembly, pivotally attached to the arm intermediate the point of attachment of the link and the guide means, and pivotally supported by the traction frame; the cylinder-piston assembly being so disposed that the path of the pivotal attachment to the arm is approximately a straight line, substantially coincident with the line of action of the piston in all positions thereof.

3. In a material-handling implement for attachment to a tractor which has a main frame and two creeping traction frames pivotally attached thereto, the combination of: two arms; and the implement proper, attached to the arms; each arm being supported and manipulated by the following described mechanism: a link, pivotally attached to the main tractor frame near the rear thereof, and pivotally attached to the arm, and so disposed that at some intermediate position of this link its line of action will intersect the line of pivotal attachment of the creeping traction frames to the main tractor frame; means attached to the arm to constrain a point on the arm to move substantially vertically; and a cylinder-piston assembly, pivotally attached to the arm intermediate the point of attachment of the link and the point of attachment of the last-named means, and pivotally supported by the traction frame; the cylinder-piston assembly being so disposed that the path of the pivotal attachment to the arm is approximately a straight line, substantially coincident with the line of action of the piston in all positions thereof.

4. In a material-handling implement for attachment to a tractor which has a main frame and two creeping traction frames pivotally attached thereto, the combination of: two arms, one for each side of the tractor; and the implement proper, attached to the arms; each arm being supported and manipulated by the following described mechanism: a link, pivotally supported by the tractor, and pivotally attached to the arm, and so disposed that at some intermediate position of this link its line of action will intersect the line of pivotal attachment of the creeping traction frames to the main tractor frame; a substantially vertical guideway, carried by the main tractor frame near the front thereof; guide means, carried by the arm, to engage the guideway; a cylinder, pivotally attached to the arm, intermediate the point of attachment of the link and the guide means; and a piston, in the cylinder, pivotally supported by the traction frame; the push-arms, the cylinder-piston assembly, the links, and the guideways being so positioned and proportioned that the reactions of the forces imposed on the links by expansion of the cylinder-piston assembly in substantially all positions of the push-arms, will impose upon the main tractor frame a torque about its pivot of attachment to the creeping traction frames opposite in sense to the torque imposed thereon and thereabout by virtue of the forces imposed on the guideways by the expansion of the cylinder-piston assembly.

5. In a material-handling implement for attachment to a tractor which has a main frame and two creeping traction frames pivotally attached thereto, the combination of: two arms; and the implement proper, attached to the arms; each arm being supported and manipulated by the following described mechanism: a link, pivotally attached to the main tractor frame near the rear thereof and projecting upwardly therefrom, and pivotally attached to the arm, and so disposed that at some intermediate position of this link its line of action will intersect the line of pivotal attachment of the creeping traction frames to the main tractor frame; a stop, carried by the main tractor frame, and adapted to limit the downward motion of the rear end of the arm; a substantially vertical guideway, carried by the main tractor frame near the front thereof; guide means, carried by the arm, to engage the guideway during the upper portion of its travel, and to be free of the guideway during the lower portion of its travel; and a cylinder-piston assembly, pivotally attached to the arm intermediate the point of attachment of the link and the guide means, and pivotally supported by the traction frame; the push-arms, the cylinder-piston assembly, the links, and the guideways being so positioned and proportioned that the reactions of the forces imposed on the links by expansion of the cylinder-piston assembly, in substantially all positions of the push-arms, will impose upon the main tractor frame a torque about its pivot of attachment to the creeping traction frames opposite in sense to the torque imposed thereon and thereabout by virtue of the forces imposed on the guideways by the expansion of the cylinder-piston assembly.

6. In a material-handling implement for attachment to a tractor which has a main frame and two creeping traction frames pivotally attached thereto, the combination of: two arms; and the implement proper, attached to the arms; each arm being supported and manipulated by the following described mechanism: a link, pivotally attached to the main tractor frame near the rear thereof and projecting upwardly therefrom, and pivotally attached to the arm, and so disposed that at some intermediate position of this link its line of action will intersect the line of pivotal attachment of the creeping traction frames to the main tractor frame; a stop, carried by the main tractor frame, and adapted to limit the downward motion of the rear end of the arm; means, attached to the arm, to constrain a point on the arm to move substantially vertically; and a cylinder-piston assembly, pivotally attached to the arm intermediate the point of attachment of the link and the point of attachment of the last-named means, and pivotally supported by the traction frames; the push-arms, the cylinder-piston assembly, the links, and the guideways being so positioned and proportioned that the reactions of the forces imposed on the links by expansion of the cylinder-piston assembly, in substantially all positions of the push-arms, will impose upon the main tractor frame a torque about its pivot of attachment to the creeping traction frames opposite in sense to the torque imposed thereon and thereabout by virtue of the forces imposed on the guideways by the expansion of the cylinder-piston assembly.

7. In a material-handling implement for attachment to a tractor which has a main frame and two creeping traction frames pivotally attached thereto, the combination of: two arms; and the implement proper, attached to the arms; each arm being supported and manipulated by the following described mechanism: a link, pivotally attached to the arm, and so disposed that at some intermediate position of this link its line of action will intersect the line of pivotal attachment of the creeping traction frames to the main tractor frame; a stop, adapted to limit the downward motion of the rear end of the arm; a substantially vertical guideway, carried by the main tractor frame near the front thereof; guide means, carried by the arm, to engage the guideway during the upper portion of its travel, and to be free of the guideway during the lower portion of its travel; and a cylinder-piston assembly, pivotally attached to the arm intermediate the point of attachment of the link and the guide means, and pivotally supported by the traction frame.

8. In a material-handling implement for attachment to a tractor which has a main frame and two creeping traction frames pivotally attached thereto, the combination of: two arms, one for each side of the tractor; and the implement proper, attached to the arms; each arm being supported and manipulated by the following described mechanism: a link, pivotally supported by the main tractor frame near the rear thereof and projecting upwardly therefrom, and pivotally attached to the arm; a stop, adapted to limit the downward motion of the rear end of the arm; a substantially vertical guideway, carried by the main tractor frame near the front thereof; guide means carried by the arm, to engage the guideway during the upper portion of its travel, and to be free of the guideway during the lower portion of its travel; and means, carried by the traction-frame, to impose a lifting force on the arm, intermediate the point of attachment of the link and the guide means.

9. In a material-handling implement for attachment to a tractor which has a main frame and two creeping traction frames pivotally attached thereto, the combination of: two arms; and the implement proper, attached to the arms; the arms being supported and manipulated by the following described mechanism: means, carried by the main frame, to support and guide the rear of the arms in a path above the axis of pivotal attachment of the creeping traction frames to the main frame, said path being so disposed that a line perpendicular to the path in its rear portion will lie forward of said axis, and that a line perpendicular to the path in its forward portion will lie to the rear of said axis; means, carried by the main frame, to support and guide the front of the arms in a substantially vertical path; and lifting means, supported by the traction frames, and applied to the arms intermediate the two first-mentioned means.

10. A material-handling implement according to claim 9, further characterized by the fact that the lifting means of each arm is so disposed that the path of its point of application to the arm is approximately a straight line, substantially coincident with the line of action of the lifting means in all positions of the arm.

11. A material-handling implement according to claim 9, further characterized by the fact that all three means are so disposed and proportioned that the reactions imposed on the first means by the lifting force of the third means, in substantially all positions of the arms, will impose upon the main tractor frame a torque about its axis of attachment to the creeping traction frames, opposite in sense to the torque imposed thereon and thereabout by virtue of the forces imposed on the second means by the lifting force of the third means.

12. In a material-handling implement for attachment to a tractor which has a main frame and two creeping traction frames pivotally attached thereto, the combination of: two arms; and the implement proper, attached to the arms; each arm being supported and manipulated by the following described mechanism: means, carried by the main frame, to support and guide the rear of the arms in an upwardly and forwardly inclined path above and to the rear of the axis of pivotal attachment of the creeping traction frames to the main frame; means, carried by the main frame, to support and guide the front of the arms in a substantially vertical path; and lifting means, supported by the traction frames, and applied to the arms intermediate the two first-mentioned means.

GEORGE W. MORK.